United States Patent
Qu (10) Patent No.: US 10,419,241 B2
(45) Date of Patent: *Sep. 17, 2019

(54) TRAFFIC FORWARDING

(71) Applicant: HEWLETT PACKARD ENTERPRISE DEVELOPMENT LP, Houston, TX (US)

(72) Inventor: Weiliang Qu, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/016,080

(22) Filed: Jun. 22, 2018

(65) Prior Publication Data

US 2018/0367342 A1    Dec. 20, 2018

Related U.S. Application Data

(63) Continuation of application No. 14/372,817, filed as application No. PCT/CN2013/077375 on Jun. 18, 2013, now Pat. No. 10,050,808.

(30) Foreign Application Priority Data

Jul. 10, 2012 (CN) ............ 2012 1 0236574

(51) Int. Cl.
*H04L 12/46* (2006.01)
*H04L 12/721* (2013.01)
(Continued)

(52) U.S. Cl.
CPC ...... *H04L 12/4675* (2013.01); *H04L 12/2852* (2013.01); *H04L 12/4641* (2013.01); *H04L 45/66* (2013.01); *H04L 45/04* (2013.01)

(58) Field of Classification Search
None
See application file for complete search history.

(56) References Cited

U.S. PATENT DOCUMENTS 8,149,836 B2  4/2012  Porat
8,675,664 B1  3/2014  Kamath
(Continued)

FOREIGN PATENT DOCUMENTS

CN    101286990    10/2008
CN    101534209    9/2009
(Continued)

OTHER PUBLICATIONS

BGP/MPLS IP Virtual Private Networks (VPNs), Feb. 2006, E. Rosen, 47 pages.
(Continued)

*Primary Examiner* — Ayaz R Sheikh
*Assistant Examiner* — Sori A Aga (57) ABSTRACT

The present disclosure describes traffic forwarding in a network where a virtual local area network (VLAN) exists in multiple network sites that are geographically dispersed and connected via virtual links. A first edge device (ED) at a first site receives, from a second ED at a second site, information identifying a VLAN of the second ED through a virtual link. The VLAN identified in the information is an active VLAN of the second ED. An association between (i) the VLAN of the second ED and (ii) the virtual link through which the information is received from the second ED is recorded. When forwarding traffic to the VLAN of the second ED, it is determined the virtual link associated with the VLAN of the second ED is determined based on the recorded association and the traffic is forwarded via the determined virtual link.

18 Claims, 4 Drawing Sheets

(51) Int. Cl.
H04L 12/28 (2006.01)
*H04L 12/715* (2013.01)

(56) References Cited

U.S. PATENT DOCUMENTS

| | | |
|---|---|---|
| 10,050,808 B2 * | 8/2018 | Qu ..................... H04L 12/4641 |
| 2003/0110268 A1 | 6/2003 | Kermarec et al. |
| 2008/0062994 A1 | 3/2008 | Porat |
| 2010/0329265 A1 | 12/2010 | Lapuh et al. |
| 2011/0286452 A1 | 11/2011 | Balus et al. |
| 2012/0106360 A1 | 5/2012 | Saassi et al. |
| 2013/0094474 A1 | 4/2013 | Le Clech et al. |
| 2013/0148657 A1 * | 6/2013 | Salam ..................... H04L 45/66 370/390 |

FOREIGN PATENT DOCUMENTS

| | | |
|---|---|---|
| CN | 101729500 | 6/2010 |
| CN | 102413061 | 4/2012 |
| EP | 2346217 | 7/2008 |
| WO | WO-2008103349 | 8/2008 |
| WO | WO-2012001297 | 1/2012 |

OTHER PUBLICATIONS

Extended European Search Report dated Feb. 3, 2016, EP Patent Application No. 13816995.8 dated Jun. 18, 2013, European Patent Office, 8 pages.

International Search Report and Written Opinion dated Sep. 26, 2013 issued on PCT Patent Application No. PCT/CN2013/077375 dated Jun. 18, 2013, The State intellectual Property Office, P.R. China, 10 pages.

Zhang, Xiaojie, et al., "Layer 2 Everywhere: Oyeroming Overlay Transport Virtualization (OTV) Site Limitations Within and Between Data Centers", CISCO White Paper, Mar. 2012, pp. 11-19 and figures 6-10, 46 pages.

* cited by examiner

TRAFFIC FORWARDING

PRIORITY

This application is a Continuation of commonly assigned and co-pending U.S. patent application Ser. No. 14/372,817, filed Jul. 17, 2014, which is a national stage filing under 35 U.S.C. § 371 of PCT Application Number PCT/CN2013/077375, having an international filing date of Jun. 18, 2013, which claims foreign priority to Chinese Application Ser. No. 201210236574.X, filed Jul. 10, 2012, the disclosures of which are hereby incorporated by reference in their entireties.

BACKGROUND

To provide better services, network providers often deploy multiple data centres in different physical locations for load sharing and improved reliability. For example, virtual machine migration allows data centres to share workloads across physical machines. Since the process of virtual machine migration is transparent to users, the virtual machine generally retains its Internet Protocol (IP) address. Connecting geographically dispersed data centres at various network sites at Layer 2 facilitates such virtual machine migration.

BRIEF DESCRIPTION OF DRAWINGS

By way of examples, the present disclosure will be described with reference to the following drawings, in which.

DETAILED DESCRIPTION

In a network connecting multiple geographically dispersed network sites, traffic for a VLAN is forwarded by a first edge device (ED) at a first site to a second ED at a second site regardless of whether the VLAN is an active VLAN of the second ED (i.e. whether the second ED is responsible for forwarding traffic within the VLAN at the second site). If the second ED receives traffic for a VLAN that is not its active VLAN, it will simply discard the traffic. This wastes the processing resources of the first ED for sending unnecessary traffic, and of the second ED for receiving and processing unnecessary traffic.

The present disclosure describes traffic forwarding in a network where a VLAN exists in multiple network sites that are geographically dispersed and connected via virtual links. A first edge device (ED) at a first site receives, from a second ED at a second site, information identifying a VLAN of the second ED through a virtual link. The VLAN identified in the information is an active VLAN of the second ED. An association between (i) the VLAN of the second ED and (ii) the virtual link through which the information is received from the second ED is recorded. When forwarding traffic of the VLAN of the second ED, the virtual link associated with the VLAN of the second ED is determined based on the recorded association, and the traffic is forwarded via the determined virtual link.

According to the present disclosure, the first ED forwards traffic of a particular VLAN to a second ED only if the VLAN is an active VLAN of the second ED (i.e. the second ED is responsible for forwarding traffic within the VLAN at the second site). Since the second ED notifies the first ED of its active VLAN, it is known to the first ED whether a particular VLAN is an active VLAN of the second ED, and the associated virtual link through which the traffic is forwarded.

The present disclosure improves over the case where traffic for a VLAN is simply forwarded by the first ED to the second ED a regardless of whether the VLAN is an active VLAN of the second ED. For example, since traffic forwarding is based on the recorded association in the present disclosure, this relieves the first ED from sending unnecessary traffic (i.e. traffic for a VLAN that is not its active VLAN) to the second ED, and the second ED from receiving and processing the unnecessary traffic. Also, since the traffic is generally forwarded from the first ED to the second ED through a core network (e.g. public network), this also reduces the traffic burden on the network.

Examples will be described with reference to the accompanying drawings.

Figure 1:
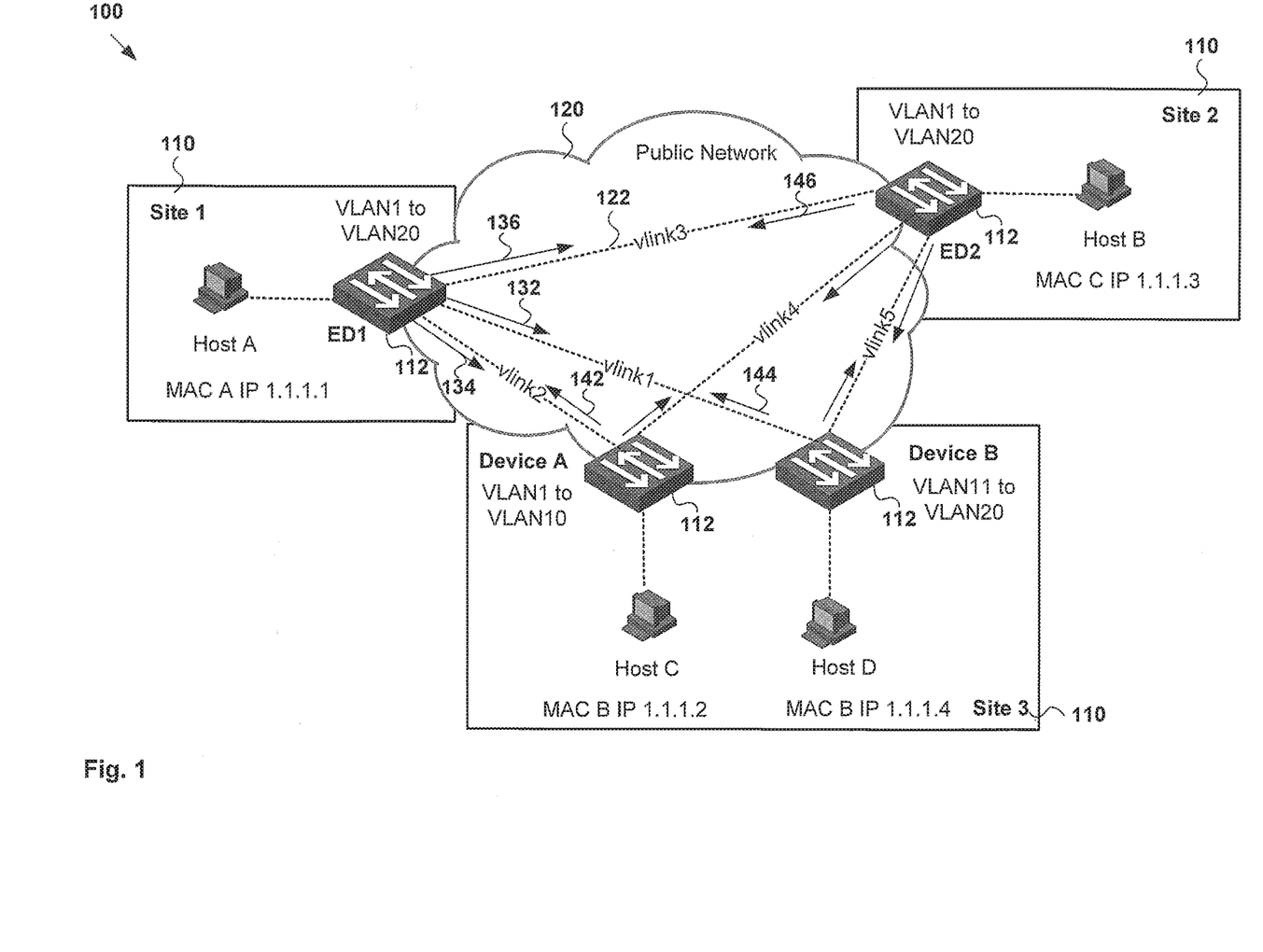
FIG. 1 is a schematic diagram of an example network for traffic forwarding, indicating flows of information identifying active virtual local area networks (VLANs)

FIG. 1 is a schematic diagram of an example network 100 where a VLAN exists in multiple network sites 110 that are geographically dispersed and connected via virtual links 122. The term "virtual link" in the present disclosure refers broadly to any communication channel suitable for connecting the geographically dispersed network sites over a Layer 3 network. In one example, a physical communication medium may be virtualized to include multiple communication channels such that traffic of one communication channel is separated from that of a different communication channel (e.g. using a suitable identifier). The virtual link may be a Layer 2 virtual link (e.g. virtual Ethernet link) tunnelled through the Layer 3 network using any suitable protocol. The example network 100 may be any suitable network, such as Ethernet Virtual Interconnect (EVI) and Overlay Transport Virtualization (OTV) etc.

There are three sites 110 in the example: Site 1, Site 2 and Site 3. Each site is deployed with a data centre which is connected to a Layer 3 public network 120 (i.e. core network) at Layer 2 via at least one ED 112. For example, Site 1 is deployed with ED1, Site 2 with ED2 and Site 3 with Device A and Device B. The EDs perform functions relating to traffic access within a virtual private network (VPN), including traffic forwarding to and from the public network 120. The EDs may be any suitable network devices, such as routers, switches etc.

In the network 100, VLAN1 to VLAN20 exist in all three network sites 110, and traffic is forwarded between EDs 112 via virtual links 122 connecting the EDs 112. A virtual link 122 will also be referred to as a "virtual layer-2 link", "virtual Ethernet link" or "vlink" in the present disclosure. For example in FIG. 1, ED1 is connected to Device B via 'vlink1', Device A via 'vlink2', and ED2 via 'vlink3'. Using an EVI network as an example, each virtual link represents a bidirectional virtual Ethernet connection between two EVI instances. Multiple virtual links are supported by an EVI tunnel to support transparent forwarding between different EDs. EVI instances, which are virtual interconnect instances, are uniquely identified by a Network ID and set up such that traffic forwarding in different EVI instances is isolated from each other.

Two types of sites are shown in FIG. 1: multi-homed and single-homed.

A multi-homed site interfaces with the public network 120 via multiple EDs. For example, Site 3 is a multi-homed site in which Device A and Device B both connect Site 3 to the public network 120. Incoming and outgoing traffic to and from the public network 120 is forwarded via Device A and/or Device B.

On the other hand, in a single-homed site, only one ED 112 serves as an incoming and outgoing interface to the public network 120. For example, Site 1 and Site 2 are connected to the public network 120 via ED1 and ED2 respectively.

When broadcasting traffic or flooding multicast traffic within the EVI network 100, the traffic is forwarded to the EDs 112 via the public network 120. For a multi-homed site with multiple EDs 112, one ED 112 is elected as the AED (Authentication ED or Authoritative ED) for a particular VLAN. When traffic for a particular VLAN is received by the AED of the VLAN, the traffic will be forwarded within the VLAN. The VLAN for which the AED is responsible as the traffic forwarder is referred to as an "active VLAN" of the AED.

A non-AED for a VLAN, however, is not responsible for traffic forwarding within that VLAN and will simply discard the received traffic. For example in FIG. 1:

ED1 at single-homed Site 1 is the AED of VLAN1 to VLAN20, which are active VLANs of ED1.

ED2 at single-homed Site 2 is the AED of VLAN1 to VLAN20, which are active VLANs of ED2.

Device A at multi-homed Site 3 is the AED of VLAN1 to VLAN10, which are active VLANs of Device A. Device A is a non-AED for VLAN11 to VLAN20, and will discard any received traffic for VLAN11 to VLAN20.

Device B at multi-homed Site 3 is the AED of VLAN11 to VLAN20, which are also active VLANs of Device B. Device B a non-AED for VLAN1 to VLAN10, and will discard any received traffic for VLAN1 to VLAN10.

Figure 2:
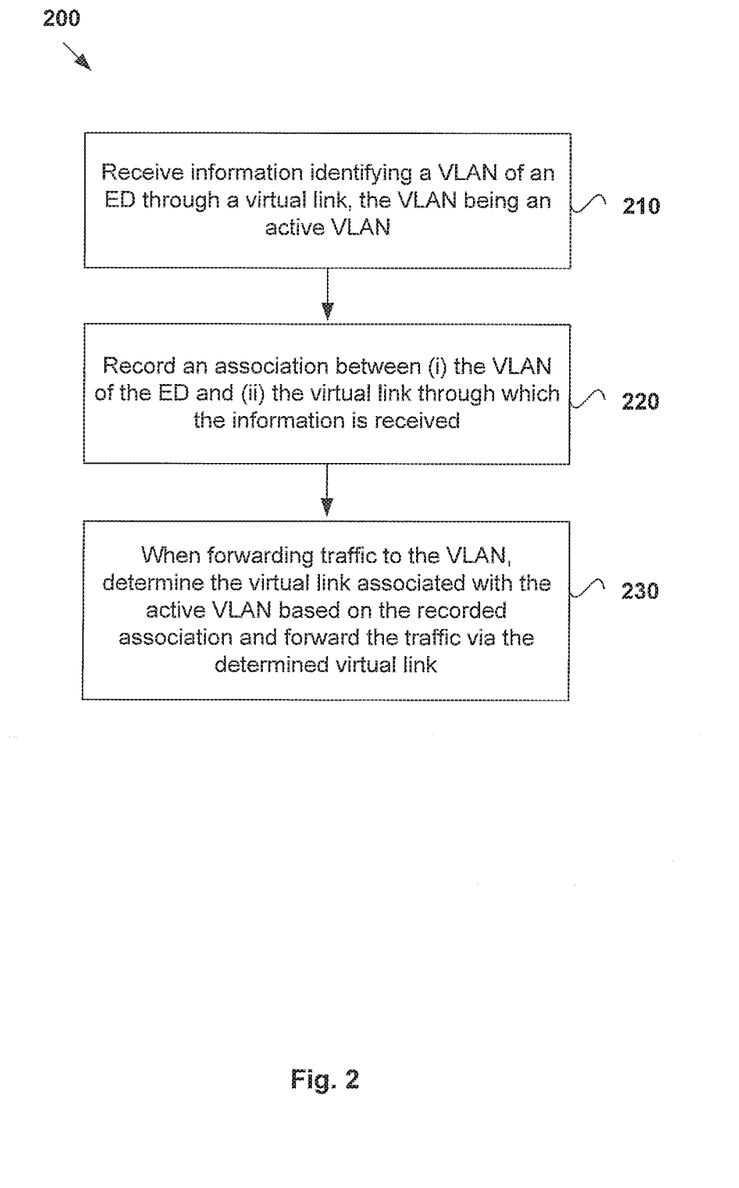
FIG. 2 is a flowchart of an example method for traffic forwarding.

FIG. 2 is a flowchart of an example method 200 for traffic forwarding in the network 100 in FIG. 1. The method 200 may be applied in a first ED 112 at a first site 100 in FIG. 1.

At block 210, the first ED receives, from a second ED at a second site, information identifying a VLAN of the second ED. The VLAN is an active VLAN of the second ED, i.e. the second ED is responsible for forwarding traffic within the VLAN at the second site.

At block 220, the first ED records an association (e.g. corresponding relationship) between (i) the VLAN identified in the received information and (ii) a virtual link through which the information is received.

At block 230, when forwarding traffic to the VLAN, the first ED determines a virtual link corresponding to the VLAN based on the recorded association, and forwards the traffic to the VLAN via the determined virtual link. The traffic may be broadcasted in the case of broadcast traffic or flooded in the case of multicast traffic.

If the first ED has any active VLAN, the first ED also sends information identifying its active VLAN or VLANs via virtual links of the first ED similar to block 210.

Figure 3:
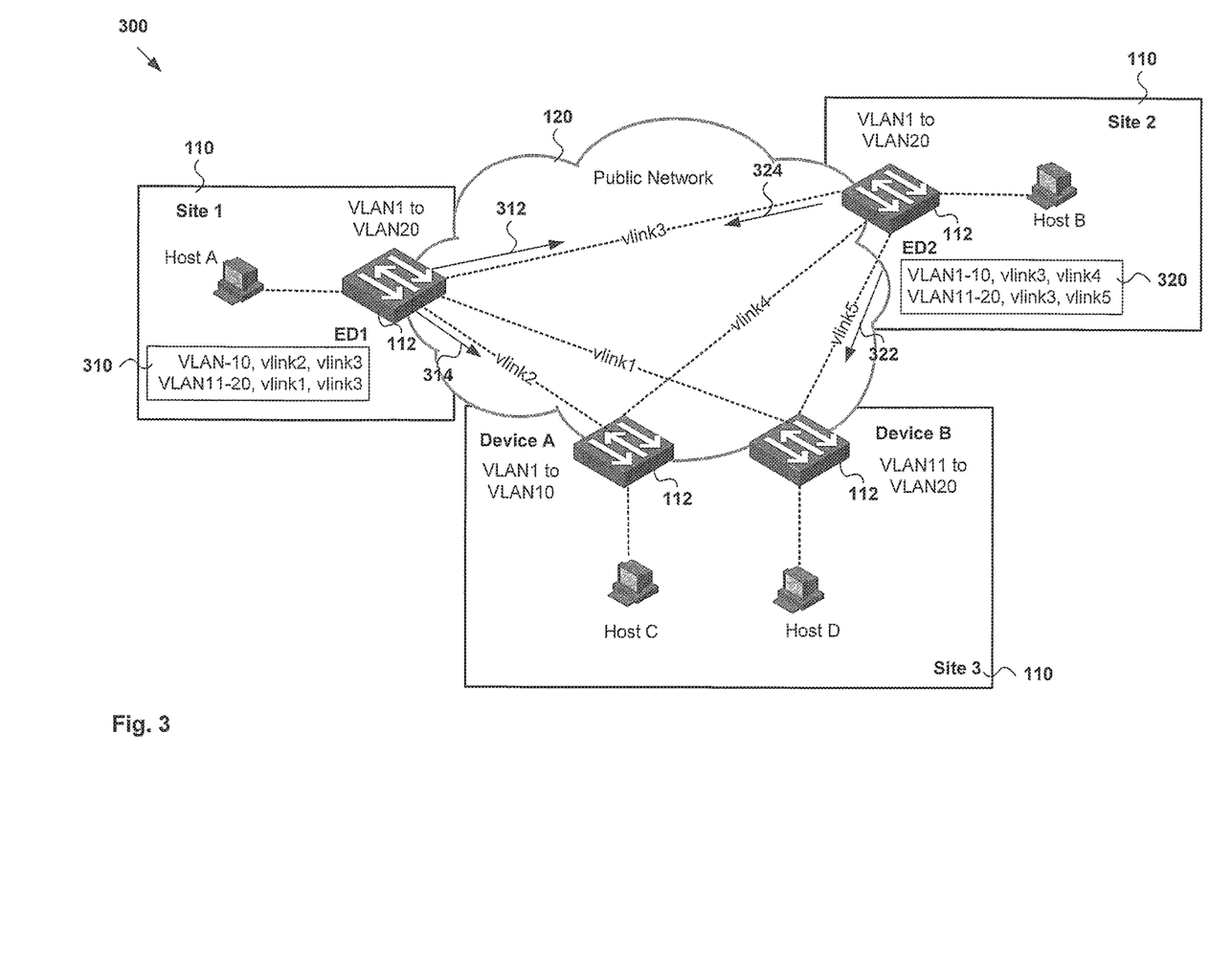
FIG. 3 is a schematic diagram of the example network environment in FIG. 1, indicating flows of traffic.

Various examples will now be described using FIG. 1 and FIG. 3. The arrows in FIG. 1 (i.e. 132, 134, 136, 142, 144, and 146) indicate the flows of information identifying active VLANs according to block 210. In FIG. 3 however, the arrows (i.e. 312, 314, 322, and 324) indicate the flows of traffic among the EDs 112.

Using ED1 in FIG. 1 and FIG. 3 as a first example:

ED1 sends information identifying its active VLANs (i.e. VLAN1-VLAN10) via its virtual links. That is, via vlink1 to Device B (see 132 in FIG. 1), vlink2 to Device A (see 134), and vlink3 to ED2 (see 136).

ED1 also receives information identifying active VLANs of other EDs (i.e. Device B, Device A and ED2) at other sites. That is, VLAN1-10 from Device A via vlink2 (see 142 in FIG. 1), VLAN11-20 from Device B via vlink1 (see 144) and VLAN1-20 from ED2 via vlink3 (see 146).

ED1 records the following associations (see also 310 in FIG. 3):

Record 1: VLAN1 to VLAN10, vlink2, vlink3.

Record 2: VLAN11 to VLAN20, vlink1, vlink3.

When forwarding traffic to VLAN1, ED1 searches Record 1 and Record 2 to determine the virtual links associated with VLAN1, i.e. vlink2 and vlink3 in Record 1. ED1 then forwards the traffic for VLAN1 via vlink2 to Device A (see 312 in FIG. 3) and via vlink3 to ED2 (see 314 in FIG. 3).

As such, in the above example, ED1 does not forward traffic for VLAN1 to Device B because vlink1 connecting ED1 and Device B is not associated with VLAN1 in Record 1 (see 310 in FIG. 3). In particular, since VLAN1 is not an active VLAN of Device B, ED1 never receives information from Device B that identifies VLAN1 as its active VLAN. This relives the public network 120 from unnecessary traffic, and Device B from processing traffic for which it is not an AED. Also, ED1 does not have to waste resources replicating the traffic and sending it to Device B.

Similarly, using ED2 in FIG. 1 and FIG. 3 as a second example:

ED2 records the following associations based on information identifying active VLANs from ED1, Device A and Device B (see 320 in FIG. 3):

Record 1: VLAN1 to VLAN10, vlink3, vlink4.

Record 2: VLAN11 to VLAN20, vlink3, vlink5.

When forwarding traffic to VLAN11, ED2 searches Record 1 and Record 2 to determine the virtual links associated with VLAN11, i.e. vlink3 and vlink5 in Record 2. ED2 then forwards the traffic via vlink5 to Device B (see 322 in FIG. 3) and via vlink3 to ED1 (see 324 in FIG. 3).

Again, ED2 does not forward traffic for VLAN11 to Device A because vlink4 connecting ED2 and Device A is not associated with VLAN11 in Record 2 (see 320 in FIG. 3). In particular, since VLAN11 is not an active VLAN of Device A, ED2 never receives information from Device A that identifies VLAN11 as its active VLAN. Again, this relives the public network 120 from unnecessary traffic, and Device A from processing traffic for which it is not an AED Also, ED2 does not have to waste processing resources for replicating the traffic to VLAN11 and sending it to Device A.

The above associations may be stored as database items in a database accessible by the ED, either locally created at an ED or a remote database. The database may be a database storing public network forwarding information etc.

In the above examples, the information identifying active VLANs may be sent using any suitable protocol, including Intermediate-System-to-Intermediate System (ISIS) protocol notification etc. In this case, the information may be included in link state packets sent using IS-IS.

In the case of a multi-homed site (e.g. Site 3 with Device A and Device B), all EDs 112 at the site 110 are configured with the same VLANs but not all of them are responsible for traffic forwarding for all VLANs. For example, the EDs may undergo a negotiation or election process to elect an ED that is responsible for traffic forwarding within particular VLAN(s).

Any suitable election process may be used. For example, in FIG. 1 and FIG. 3, VLANs 1-20 are divided equally among the Device A and Device B. Device A and Device B negotiate among themselves to select their Active VLANs, i.e. Device A is elected to be responsible for its VLAN1 to VLAN10, and Device B for VLAN11 to VLAN20. Alternatively, the VLANs may be randomly assigned to the EDs or depending of any suitable criteria such as load etc.

In the case of a single-home site, no election process is required. Since there is only one ED, the active VLANs of the ED are VLANs used for layer 2 virtual interconnect, which are also known as extended VLANs of the ED.

Edge Device 112

Figure 4:
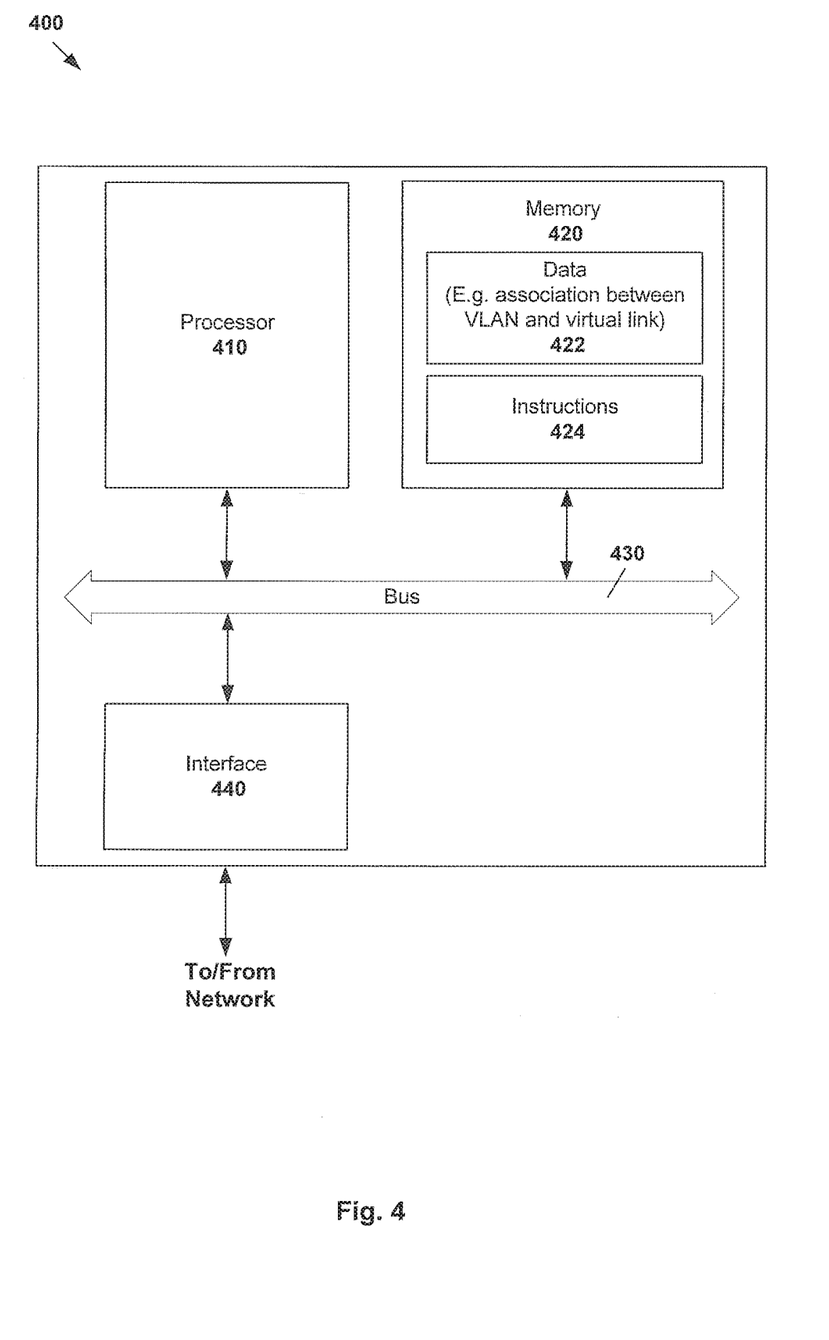
FIG. 4 is a block diagram of a first example structure of a network device capable of acting as an edge device.

The above examples can be implemented by hardware, software or firmware or a combination thereof. Referring to FIG. 4, an example network device 400 capable of acting as an ED 112 in a network 100 where exists in multiple network sites that are geographically dispersed and connected via virtual links such as the example in FIG. 1 is shown.

The example network device 400 includes a processor 410, a memory 420 and a network interface device 440 that communicate with each other via bus 430. The memory 420 stores any necessary data 422 and machine-readable instructions 424 to perform any of the processes described in the present disclosure. In one example, the data 422 may include an association between (i) a VLAN of a second ED and (ii) a virtual link through which information identifying (i) is received from the second ED.

The processor 410 is further to perform processes described herein. In one example, the network device 400 is capable of acting as a first ED at a first site in the network, and the processor 410 is to:

Receive, from a second ED at a second site, information identifying a VLAN of the second ED through a virtual link. The VLAN identified in the information is an active VLAN of the second ED.

Record an association between (i) the VLAN of the second ED and (ii) the virtual link through which the information is received from the second ED.

When forwarding traffic to the VLAN of the second ED, determine the virtual link associated with the VLAN of the second ED based on the recorded association and forward the traffic via the determined virtual link.

The memory 420 may store machine-readable instructions 424 to cause the processor 410 to perform processes described herein. In one example, the instructions 424 may include:

Receiving instructions to cause the processor 410 to receive, from a second ED at a second site, information identifying a VLAN of the second ED through a virtual link, wherein the VLAN identified in the information is an active VLAN of the second ED.

Recording instructions to cause the processor 410 to record an association between (i) the VLAN of the second ED and (ii) the virtual link through which the information is received from the second ED.

Forwarding instructions to cause the processor 410 to, when forwarding traffic to the VLAN of the second ED, determine the virtual link associated with the VLAN of the second ED based on the recorded association and forward the traffic via the determined virtual link.

The network device 400 in FIG. 4 may include units to perform the processes described herein. In one example, the network device 400 may include the following units:

Receiving unit to receive, from a second ED at a second site, information identifying a VLAN of the second ED through a virtual link. The VLAN identified in the information is an active VLAN of the second ED.

Recording unit to record an association between (i) the VLAN of the second ED and (ii) the virtual link through which the information is received from the second ED.

Forwarding unit to, when forwarding traffic to the VLAN of the second ED, determine the virtual link associated with the VLAN of the second ED based on the recorded association and forward the traffic via the determined virtual link.

The methods, processes and functional units described herein may be implemented by hardware (including hardware logic circuitry), software or firmware or a combination thereof. The term 'processor' is to be interpreted broadly to include a processing unit, ASIC, logic unit, or programmable gate array etc. The processes, methods and functional units may all be performed by the one or more processors 410; reference in this disclosure or the claims to a 'processor' should thus be interpreted to mean 'one or more processors'.

Although one network interface device 440 is shown in FIG. 4, processes performed by the network interface device 440 may be split among multiple network interface devices (not shown for simplicity). As such, reference in this disclosure to a 'network interface device' should be interpreted to mean 'one or more network interface devices''.

Further, the processes, methods and functional units described in this disclosure may be implemented in the form of a computer software product. The computer software product is stored in a storage medium and comprises a plurality of instructions for making a processor to implement the methods recited in the examples of the present disclosure.

The figures are only illustrations of an example, wherein the units or procedure shown in the figures are not necessarily essential for implementing the present disclosure. Those skilled in the art will understand that the units in the device in the example can be arranged in the device in the examples as described, or can be alternatively located in one or more devices different from that in the examples. The units in the examples described can be combined into one module or further divided into a plurality of sub-units.

Although the flowcharts described show a specific order of execution, the order of execution may differ from that which is depicted. For example, the order of execution of two or more blocks may be changed relative to the order shown. Also, two or more blocks shown in succession may be executed concurrently or with partial concurrence. All such variations are within the scope of the present disclosure.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A non-transitory computer readable storage medium storing instructions that when executed cause a processor of a first edge device (ED) at a first site to:

record in a table an association between a first, active virtual local area network (VLAN) of a second ED at a second site and a first virtual link connected between the first ED and the second ED, wherein the second site further includes a third ED connected to the first ED via a second virtual link, and the first VLAN is not an active VLAN of the third ED;

when forwarding traffic to the first VLAN at the second site, determine from the recorded association in the table that the first VLAN at the second site is associated with the first virtual link; and based on the determination from the recorded association, forward the traffic via the first virtual link to the second ED at the second site and not via the second virtual link of the third ED at the second site.

2. The non-transitory computer readable storage medium of claim 1, wherein, prior to recording the association, the processor is to:

receive, from the second ED at the second site via the first virtual link, information identifying that the first VLAN is an active VLAN of the second ED at the second site.

3. The non-transitory computer readable storage medium of claim 1, wherein the instructions are to cause the processor of the first ED to:

send information identifying a VLAN that is an active VLAN of the first ED via a virtual link of the first ED.

4. The non-transitory computer readable storage medium of claim 3, wherein the first site is a multi-homed site that connects to a public network via the first ED and at least one other ED, and the instructions are to cause the processor of the first ED to:

negotiate with the at least one other ED to elect the first ED as being responsible for traffic forwarding within the active VLAN of the first ED.

5. The non-transitory computer readable storage medium of claim 3, wherein the first site is a single-homed site that connects to a public network via the first ED only, and the instructions are to cause the processor of the first ED to:

set a VLAN used for layer 2 virtual interconnection as the active VLAN of the first ED.

6. The non-transitory computer readable storage medium of claim 1, wherein the instructions are to cause the processor of the first ED to:

receive, from the third ED at the second site via the second virtual link, information identifying that a second VLAN at the second site is an active VLAN of the third ED;

record in the table an association between the second VLAN at the second site and the second virtual link connected between the first ED and the third ED;

when forwarding traffic to the second VLAN at the second site, determine from the recorded associations in the table that the second VLAN at the second site is associated with the second virtual link; and based on the determination from the recorded associations, forward the traffic via the second virtual link to the third ED at the second site and not via the first virtual link of the second ED.

7. A method for traffic forwarding a first edge device (ED) at a first site, the method comprising:

recording, by a processor of the first ED, in a table an association between a first, active virtual local area network (VLAN) of a second ED at a second site and a first virtual link connected between the first ED and the second ED, wherein the second site further includes a third ED connected to the first ED via a second virtual link, and the first VLAN is not an active VLAN of the third ED;

when forwarding traffic to the first VLAN at the second site, determining, by the processor, from the recorded association in the table that the first VLAN at the second site is associated with the first virtual link; and based on the determination from the recorded association, forwarding, by the processor, the traffic via the first virtual link to the second ED at the second site and not via the second virtual link of the third ED at the second site.

8. The method of claim 7, further comprising:

prior to recording the association, receiving, by the first ED, information from the second ED identifying that the first VLAN is an active VLAN of the second ED at the second site.

9. The method of claim 7, further comprising:

sending, by the processor of the first ED, information identifying a VLAN that is an active VLAN of the first ED via a virtual link of the first ED.

10. The method of claim 9, wherein the first site is a multi-homed site that connects to a public network via the first ED and at least one other ED, and the method further comprises:

negotiating, by the processor of the first ED, with the at least one other ED to elect the first ED as being responsible for traffic forwarding within the active VLAN of the first ED.

11. The method of claim 9, wherein the first site is a single-homed site that connects to a public network via the first ED only, and the method further comprises:

setting, by the processor of the first ED, a VLAN used for layer 2 virtual interconnection as the active VLAN of the first ED.

12. The method of claim 7, further comprising:

receiving, from the third ED at the second site via the second virtual link, information identifying that a second VLAN at the second site is an active VLAN of the third ED;

recording, by the processor of the first ED, in the table an association between the second VLAN at the second site and the second virtual link connected between the first ED and the third ED;

when forwarding traffic to the second VLAN at the second site, determining, by the processor, from the recorded associations in the table that the second VLAN at the second site is associated with the second virtual link; and based on the determination from the recorded associations, forwarding, by the processor, the traffic via the second virtual link to the third ED at the second site and not via the first virtual link of the second ED.

13. A first edge device (ED) at a first site, comprising:
a processor; and
a memory storing instructions that when executed cause the processor to:

record in a table an association between a first, active virtual local area network (VLAN) of a second ED at a second site and a first virtual link connected between the first ED and the second ED, wherein the second site further includes a third ED connected to the first ED via a second virtual link, and the first VLAN is not an active VLAN of the third ED;

when forwarding traffic to the first VLAN at the second site, determine from the recorded association in the table that the first VLAN at the second site is associated with the first virtual link; and based on the determination from the recorded association, forward the traffic via the first virtual link to the second ED at the second site and not via the second virtual link of the third ED at the second site.

14. The first ED of claim 13, wherein the processor is to:
receive, from the second ED via the first virtual link, information identifying that the first VLAN is an active VLAN of the second ED at the second site.

15. The first ED of claim 13, wherein the instructions are to cause the processor to:
send information identifying a VLAN that is an active VLAN of the first ED via a virtual link of the first ED.

16. The first ED of claim 15, wherein the first site is a multi-homed site that connects to a public network via the first ED and at least one other ED, and the instructions are to cause the processor to:
negotiate with the at least one other ED to elect the first ED as being responsible for traffic forwarding within the active VLAN of the first ED.

17. The first ED of claim 15, wherein the first site is a single-homed site that connects to a public network via the first ED only, and the instructions are to cause the processor to: and the instructions are to cause the processor to:
set a VLAN used for layer 2 virtual interconnection as the active VLAN of the first ED.

18. The first ED of claim 13, wherein the instructions are to cause the processor to:
receive, from the third ED at the second site via the second virtual link, information identifying that a second VLAN at the second site is an active VLAN of the third ED;

record, by the processor of the first ED, in the table an association between the second VLAN at the second site and the second virtual link connected between the first ED and the third ED;

when forwarding traffic to the second VLAN at the second site, determine from the recorded associations in the table that the second VLAN at the second site is associated with the second virtual link; and based on the determination from the recorded associations, forward the traffic via the second virtual link to the third ED at the second site and not via the first virtual link of the second ED.

* * * * *